United States Patent
Lee et al.

(10) Patent No.: US 7,319,818 B2
(45) Date of Patent: Jan. 15, 2008

(54) WAVELENGTH-DIVISION-MULTIPLEXED PASSIVE OPTICAL NETWORK USING WAVELENGTH-LOCKED OPTICAL TRANSMITTER

(75) Inventors: Jae-Hoon Lee, Seoul (KR); Yong-Gyoo Kim, Seoul (KR); Yun-Je Oh, Yongin-si (KR); Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/471,152

(22) Filed: Jun. 20, 2006

(65) Prior Publication Data

US 2006/0291776 A1    Dec. 28, 2006

(30) Foreign Application Priority Data

Jun. 23, 2005    (KR) .................. 10-2005-0054509

(51) Int. Cl.
    *H04J 14/00*    (2006.01)
(52) U.S. Cl. .................. 398/70; 385/24; 398/71; 398/72
(58) Field of Classification Search .................. 398/70
    See application file for complete search history.

(56) References Cited

U.S. PATENT DOCUMENTS 6,996,138 B2*    2/2006    Jung et al. .................. 372/18
7,167,649 B2*    1/2007    Song et al. .................. 398/72
2005/0276603 A1*    12/2005    Jung et al. .................. 398/71
2005/0286895 A1*    12/2005    Lee et al. .................. 398/79
2006/0182445 A1*    8/2006    Lee et al. .................. 398/72

* cited by examiner

Primary Examiner—Sung Pak
Assistant Examiner—Chad H. Smith
(74) Attorney, Agent, or Firm—Cha & Reiter, LLC

(57) ABSTRACT

Disclosed is a wavelength-division-multiplexed passive optical network using a wavelength-locked optical transmitter. The wavelength-division-multiplexed passive optical network (WDM PON) includes a central office, which includes a plurality of downstream optical transmitters for outputting downstream optical signals having wavelengths according to downstream injection lights, a wavelength division multiplexer including a plurality of de-multiplexing ports linked to the plurality of the downstream optical transmitters by one-to-one, and a multiplexing port linked with the feeder fiber and performing wavelength division multiplexing and wavelength division de-multiplexing, and at least one optical switch interposed between the downstream optical transmitters and the de-multiplexing ports, inputting a downstream band light output from a selected downstream optical transmitter to the multiplexing port, and inputting a downstream optical signal output from a remaining downstream optical transmitter, which is not selected, to the de-multiplexing port.

9 Claims, 2 Drawing Sheets

WAVELENGTH-DIVISION-MULTIPLEXED PASSIVE OPTICAL NETWORK USING WAVELENGTH-LOCKED OPTICAL TRANSMITTER

CLAIM OF PRIORITY

This application claims priority to an application entitled "Wavelength-Division-Multiplexed Passive Optical Network Using Wavelength-Locked Optical Transmitter," filed in the Korean Intellectual Property Office on Jun. 23, 2005 and assigned Ser. No. 2005-0054509, the contents of which are incorporated herein by reference.

BACKGROUND OF THE INVENTION

1. Field of the Invention

The present invention relates to a passive optical network (PON), and more particularly to a wavelength-division-multiplexed PON (WDM PON) using a wavelength-locked optical transmitter.

2. Description of the Related Art

A wavelength-division-multiplexed passive optical network (WDM PON) allocates a dedicated wavelength to each subscriber to provide an expandable and secure ultra high speed broadband communication services.

In order to reduce costs for realizing the WDM PON, one type of an optical transmitter has been used. At the same time, there exist efforts for using a plurality of the optical transmitters capable of outputting optical signals with various wavelengths instead of a specific wavelength. In particular, the following schemes have been suggested to use one type optical transmitter.

A first scheme is to spectrum-slice broadband optical signals output from a plurality of the optical transmitters in a wavelength division multiplexer. A second scheme is to obtain a wavelength-locked optical transmitter by injecting a light having a specific wavelength into each optical transmitter.

U.S. Published Application No. 2005/0286895 filed by Lee, Chang-Hee discloses "Bi-directional wavelength-division-multiplexing passive optical network (WDM PON) utilizing wavelength-locked light sources by injected incoherent light". Briefly, the WDM PON in Lee includes combination of an upstream broadband light source, a downstream broadband light source, and an optical coupler in order to generate an optical signal having a specific wavelength by injecting incoherent light into an optical transmitter. The optical transmitter may be a Fabry-Perot laser diode or a reflective semiconductor optical amplifier (RSOA). In addition, the WDM PON using a wavelength-locked optical transmitter controls the power of an injection light, so that it is possible to improve the transmission quality, which also serves to enhance the transmission rate.

As described above, since the conventional WDM PON uses combination of an upstream broadband light source, a downstream broadband light source, and an optical coupler in order to obtain a wavelength-locked optical transmitter, costs associated with the WDM PON and the power reinforcement of an injection light may be increased.

Accordingly, there is a need for a WDM PON using a wavelength-locked optical transmitter capable of ensuring a high quality at low costs.

SUMMARY OF THE INVENTION

Accordingly, the present invention has been made to solve the above-mentioned problems occurring in the prior art and provides additional advantages, by providing an economical WDM PON using a wavelength-locked optical transmitter capable of ensuring a high quality.

In one embodiment, there is provided a wavelength-division-multiplexed passive optical network (WDM PON) including a central office, which transmits a multiplexed downstream optical signal, and a plurality of subscriber devices, which receive the multiplexed downstream optical signal through a feeder fiber. The inventive central office includes: a plurality of downstream optical transmitters for outputting downstream optical signals having wavelengths according to downstream injection lights, a wavelength division multiplexer including a plurality of de-multiplexing ports linked to the plurality of the downstream optical transmitters by one-to-one, a multiplexing port linked to the feeder fiber for performing wavelength division multiplexing and wavelength division de-multiplexing, and at least one optical switch interposed between the downstream optical transmitters and the de-multiplexing ports for inputting a downstream band light output from a selected downstream optical transmitter to the multiplexing port, and inputting a downstream optical signal output from a remaining downstream optical transmitter, which is not selected, to the de-multiplexing port.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. For the purposes of clarity and simplicity, a detailed description of well-known functions and configurations incorporated herein will be omitted as it may make the subject matter of the present invention unclear.

Figure 1:
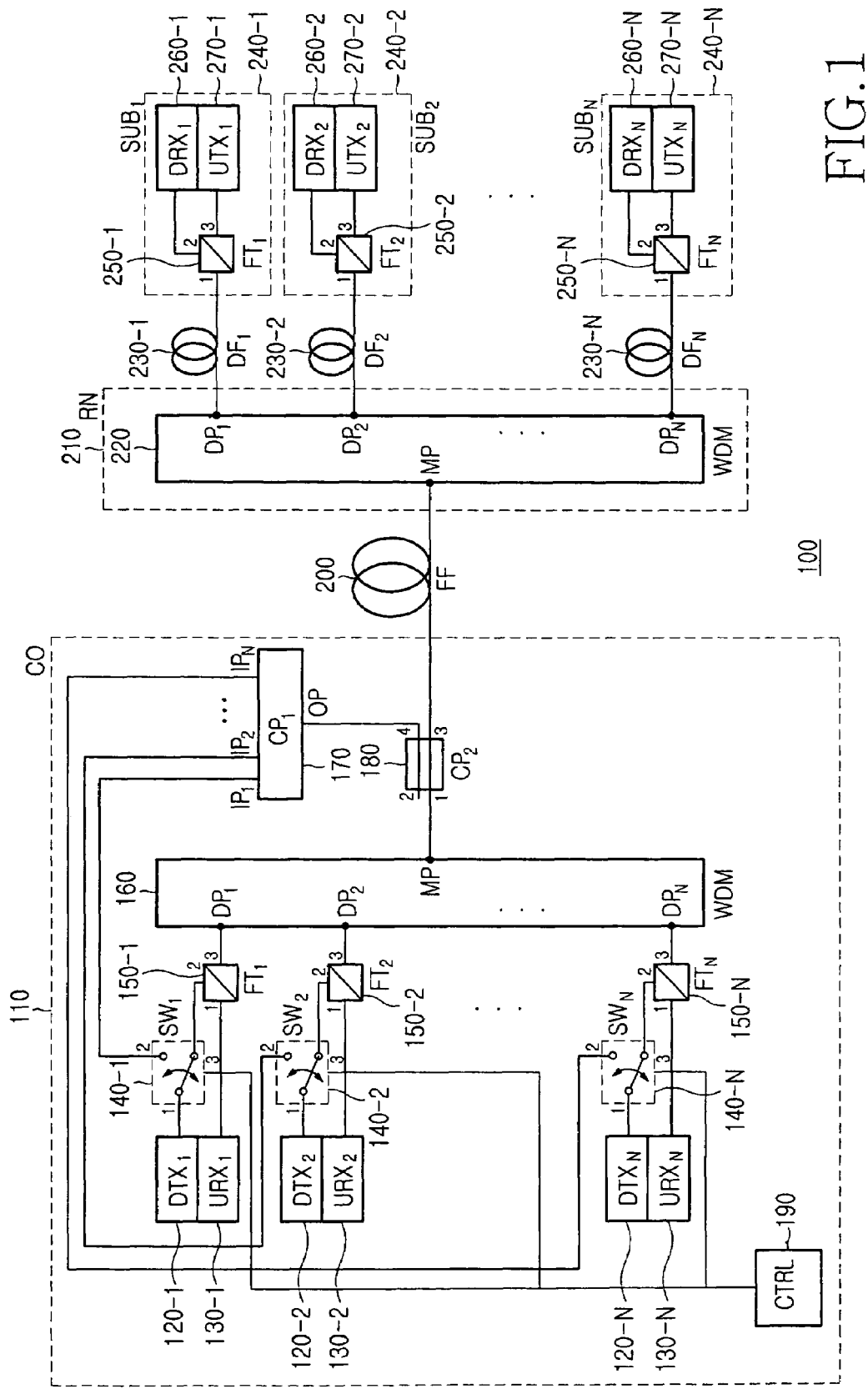
FIG. 1 is a block diagram illustrating a structure of a WDM PON according to a first preferred embodiment of the present invention.

FIG. 1 illustrates the structure of a wavelength-division-multiplexed passive optical network (WDM-PON) 100 according to a first embodiment of the present invention. As shown, the WDM-PON 100 includes a central office (CO) 110, a remote node (RN) 210 linked to the CO 110 via a feeder fiber (FF) 200, and a first subscriber device (SUB) 240-1 to an $N^{th}$ subscriber device (SUB) 240-N sequentially linked to the RN 210 via a first distribution fiber (DF) 230-1 to an $N^{th}$ distribution fiber 230-N.

In operation, the CO 110 transmits a multiplexed downstream optical signal having a downstream wavelength band (downstream band) to the RN 210 through the feeder fiber 200, and receives a multiplexed upstream optical signal having an upstream wavelength band (upstream band) through the feeder fiber 200. The CO 110 includes a first downstream optical transmitter (DTX) 120-1 to an $N^{th}$ downstream optical transmitter (DTX) 120-N, a first upstream optical receiver (URX) 130-1 to an $N^{th}$ upstream optical receiver (URX) 130-N, a first optical switch (SW) 140-1 to an $N^{th}$ optical switch (SW) 140-N, a first optical filter (FT) 150-1 to an $N^{th}$ optical filter (FT) 150-N, a wavelength division multiplexer (WDM) 160, a first optical coupler (CP) 170, a second optical coupler 180, and a controller (CTRL) 190.

The first to $N^{th}$ downstream optical transmitters 120-1 to 120-N are sequentially linked to the first to $N^{th}$ optical switch 140-N 140-1 to 140-N in a one-to-one relationship. If an injection light is not input, the $N^{th}$ downstream optical transmitter 120-N outputs a downstream band light having a first downstream wavelength to an $N^{th}$ downstream wavelength. If an $N^{th}$ downstream injection light having an $N^{th}$ downstream wavelength is input, the $N^{th}$ downstream optical transmitter 120-N outputs an $N^{th}$ downstream optical signal having the $N^{th}$ downstream wavelength, which is created by the $N^{th}$ downstream injection light and undergoes data modulation. Each of the first downstream optical transmitter 120-1 to the $N^{th}$ downstream optical transmitter 120-N may be a Fabry-Perot laser diode or a reflective semiconductor optical amplifier. The Fabry-Perot laser diode has a plurality of spectral modes. The Fabry-Perot laser diode generates a mode corresponding to a wavelength of an input downstream injection light by amplifying the wavelength. The reflective semiconductor optical amplifier has a broadband gain curve and outputs light by amplifying an input downstream injection light.

The first upstream optical receiver 130-1 to the $N^{th}$ upstream optical receiver 130-N are sequentially linked to the first optical switch 140-1 to the $N^{th}$ optical switch 140-N. The $N^{th}$ upstream optical receiver 130-N converts an input $N^{th}$ upstream optical signal into an electrical signal. A photodiode may be employed for the first upstream optical receiver 130-1 to the $N^{th}$ upstream optical receiver 130-N.

The first optical switch 140-1 to the $N^{th}$ optical switch 140-N are arranged in such a manner that they link the downstream optical transmitters with corresponding optical filters or the first optical coupler 170. The $N^{th}$ optical switch 140-N has a first port to a third port. The first port to the third port of the $N^{th}$ optical switch 140-N are linked to the $N^{th}$ downstream optical transmitter 120-N, the first optical coupler 170, and the $N^{th}$ optical filter 150-N, respectively. The $N^{th}$ optical switch 140-N links the $N^{th}$ downstream optical transmitter 120-N with the $N^{th}$ optical filter 150-N or the first optical coupler 170 according to a control signal of the controller 190.

The first optical filter 150-1 to the $N^{th}$ optical filter 150-N are arranged in such a manner that they link the upstream optical receivers, the optical switches, and the wavelength division multiplexer (WDM) 160 together. The $N^{th}$ optical filter 150-N has first to third ports. The first port of the $N^{th}$ optical filter 150-N is a path for an upstream band and is linked to the $N^{th}$ upstream optical receiver 130-N, the second port of the $N^{th}$ optical filter 150-N is a path for a downstream band and is linked to the third port of the $N^{th}$ optical switch 140-N, and the third port of the $N^{th}$ optical filter 150-N is a path for upstream and downstream bands and is linked to the WDM 160. The $N^{th}$ optical filter 150-N is a wavelength dependent element for outputting an $N^{th}$ downstream optical signal, which has been input into the second port, to the third port and outputting an $N^{th}$ downstream injection light, which has been input into the third port, to the second port. In addition, the $N^{th}$ optical filter 150-N outputs an $N^{th}$ upstream optical signal, which has been input into the third port, to the first port.

The first optical coupler 170 is arranged in such a manner that it links the first optical switch 140-1 to the $N^{th}$ optical switch 140-N with the second optical coupler 180. The first optical coupler 170 includes first to $N^{th}$ input ports (IPs) and an output port (OP). The first input port to the $N^{th}$ input port are linked to the second ports of the first optical switch 140-1 to the $N^{th}$ optical switch 140-N in a one-to-one relationship, and the output port is linked to the second optical coupler 180. The first optical coupler 170 couples downstream band lights, which are input to the input ports, with each other so as to output a coupled downstream band light through the output port.

The second optical coupler 180 is arranged in such a manner that it links the output port of the first optical coupler 170 with the WDM 160. The second optical coupler 180 includes first to fourth ports. The first port is linked to the WDM 160, the second port terminates an optical signal, the third port is linked to the feeder fiber 200, and the fourth port is linked to the output port of the first optical coupler 170. The second optical coupler 180 outputs a downstream band light, which is input to the fourth port, through the first port. The second optical coupler 180 outputs a multiplexed downstream optical signal, which is input to the first port, through the third port. The second optical coupler 180 outputs a multiplexed upstream optical signal, which is input to the third port, through the first port. If necessary, an optical isolator may be positioned between the first optical coupler 170 and the second optical coupler 180.

The WDM 160 is arranged in such a manner that it links the first filter 150-1 to the $N^{th}$ optical filter 150-N with the second optical coupler 180. In particular, the WDM 160 includes a multiplexing port (MP) and first to $N^{th}$ de-multiplexing ports (DPs). The multiplexing port is linked with the first port of the second optical coupler 180, and the first de-multiplexing port to the $N^{th}$ de-multiplexing port are sequentially linked with the first optical filter 150-1 to the $N^{th}$ optical filter 150-N by one-to-one. The WDM 160 sequentially outputs first to $N^{th}$ downstream injection lights, which are generated by spectrum-splicing a downstream band light input to the multiplexing port, through the first de-multiplexing port to the $N^{th}$ de-multiplexing port by one-to-one. The WDM 160 multiplexes downstream optical signals, which are input to the de-multiplexing ports, to be output through the multiplexing port. In addition, the WDM 160 de-multiplexes a multiplexed upstream optical signal, which is input to the multiplexing port, to be output through the de-multiplexing ports. A 1×N arrayed waveguide grating (AWG) may be employed as the WDM 160.

The controller 190 detects idle downstream optical transmitters among the first downstream optical transmitter 120-1 to the $N^{th}$ downstream optical transmitter 120-N. The controller 190 can detect destinations based on a list of data in a transmission waiting state. In addition, the controller 190 can recognize downstream optical transmitters allocated to SUBs absent from the data list as idle downstream optical transmitters. For example, a process transmitting a downstream optical signal in the CO 110 when only the $N^{th}$ downstream optical transmitter 120-N is in the idle state will be described below.

The controller 190 controls the first optical switch 140-1 to the $(N-1)^{th}$ optical switch 140-(N-1) to connect the first ports thereof to the third ports thereof. In addition, the controller 190 controls the $N^{th}$ optical switch 140-N to link the first port thereof to the second port of thereof. A downstream band light output from the $N^{th}$ downstream optical transmitter 120-N is input to the multiplexing port of the WDM 160 by sequentially passing through the $N^{th}$ optical switch 140-N, the first optical coupler 170, and the second optical coupler 180. The WDM 160 sequentially outputs first to $N^{th}$ downstream injection lights, which are generated by spectrum-splicing the input downstream band light, through the first de-multiplexing port to the $N^{th}$ de-multiplexing port by one-to-one. The first downstream injection light to the $(N-1)^{th}$ downstream injection light are input to the first downstream optical transmitter 120-1 to the $(N-1)^{th}$ downstream optical transmitter 120-(N-1) through the first optical filter 150-1 to the $(N-1)^{th}$ optical filter 150-(N-1) and the first optical switch 140-1 to the $(N-1)^{th}$ optical switch 140-(N-1). The first downstream optical transmitter 120-1 to the $(N-1)^{th}$ downstream optical transmitter 120-(N-1) output first to $(N-1)^{th}$ downstream optical signals, which are generated by the first downstream injection light to the $(N-1)^{th}$ downstream injection light and undergo data modulation. The first downstream optical signal to the $(N-1)^{th}$ downstream optical signal are input to the WDM 160 through the first optical switch 140-1 to the $(N-1)^{th}$ optical switch 140-(N-1) and the first optical filter 150-1 to the $(N-1)^{th}$ optical filter 150-(N-1). The WDM 160 multiplexes the first downstream optical signal to the $(N-1)^{th}$ downstream optical signal to be output through the multiplexing port. The $N^{th}$ downstream injection light disappears after it is input to the third port of the $N^{th}$ optical switch (140-N) through the $N^{th}$ optical filter 150-N.

Meanwhile, the RN 210 transmits spliced downstream optical signals obtained by de-multiplexing a multiplexed downstream optical signal, which are input through the feeder fiber 200, to the SUBs through the distribution fibers. In addition, the RN 210 transmits a multiplexed upstream optical signal obtained by multiplexing upstream optical signals, which are input through the distribution fibers, to the CO 110 through the feeder fiber 200. The RN 210 includes a WDM 220.

The WDM 220 is arranged in such a manner that it links the feeder fiber 200 with the first distribution fiber 230-1 to the $N^{th}$ distribution fiber 230-N. In particular, the WDM 220 includes a multiplexing port and first to $N^{th}$ de-multiplexing ports. The multiplexing port is linked to the feeder fiber 200, and the first de-multiplexing port to the $N^{th}$ de-multiplexing port are sequentially linked to the first distribution fiber 230-1 to the $N^{th}$ distribution fiber 230-N in a one-to-one relationship. The WDM 220 de-multiplexes a multiplexed downstream optical signal, which is input to the multiplexing port, to be output through the de-multiplexing ports. In addition, the WDM 220 multiplexes upstream optical signals, which are input to the de-multiplexing ports, to be output through the multiplexing port. At this time, the WDM 220 outputs a de-multiplexed $N^{th}$ downstream optical signal through the $N^{th}$ de-multiplexing port. A 1×N arrayed waveguide grating (AWG) may be employed as the WDM 220.

The first SUB 240-1 to the $N^{th}$ SUB 240-N transmit upstream optical signals to the RN 210 through the distribution fibers, and receive downstream optical signals through the distribution fibers. The $N^{th}$ SUB 240-N includes an $N^{th}$ optical filter 250-N, an N downstream optical receiver (DRX) 260-N, and an $N^{th}$ upstream optical transmitter (UTX) 270-N.

The $N^{th}$ optical filter 250-N is arranged in such a manner that it links the $N^{th}$ distribution fiber 230-N with the $N^{th}$ downstream optical receiver 260-N and the $N^{th}$ upstream optical transmitter 270-N. The $N^{th}$ optical filter 250-N has first to third ports. The first port, which is a path for upstream and downstream wavelength bands, is linked to the $N^{th}$ distribution fiber 230-N, the second port, which is a path for a downstream wavelength band, is linked to the $N^{th}$ downstream optical receiver 260-N, and the third port, which is a path for an upstream wavelength band, is linked to the $N^{th}$ upstream optical transmitter 270-N. The $N^{th}$ optical filter 250-N, which is a wavelength dependent element, outputs the $N^{th}$ downstream optical signal, which is input to the first port, to the second port. The $N^{th}$ optical filter 250-N outputs the $N^{th}$ upstream optical signal, which is input to the third port, to the first port.

The $N^{th}$ upstream optical transmitter 270-N is linked to the third port of the $N^{th}$ optical filter 250-N. The $N^{th}$ upstream optical transmitter 270-N outputs an $N^{th}$ upstream optical signal having an $N^{th}$ upstream wavelength, which undergoes data modulation. A laser diode for outputting a light having a specific wavelength may be employed as the $N^{th}$ upstream optical transmitter 270-N.

The $N^{th}$ downstream optical receiver 260-N is linked to the second port of the $N^{th}$ optical filter 250-N. The $N^{th}$ downstream optical receiver 260-N converts an $N^{th}$ downstream optical signal, which has been input, into an electrical signal. A photodiode may be employed as the $N^{th}$ optical receiver 260-N.

As described above, the WDM-PON 100 according to a first preferred embodiment of the present invention utilizes downstream band lights output from idle downstream optical transmitters as injection light sources for remaining downstream optical transmitters, so that it is possible to ensure a superior transmission quality at a low cost. It is possible to easily reinforce the power of the downstream injection lights by increasing the number of downstream optical transmitters utilized as the injection light sources.

In the typical WDM-PON, downstream transmission traffic has a greater amount of traffic as compared with that of upstream transmission traffic because transmission traffic mainly includes Internet data. Accordingly, although the WDM-PON according to the first preferred embodiment of the present invention has been described while focusing on the downstream transmission, it should be noted that the teachings of the present invention is also adaptable for upstream transmission.

In addition, since the transmission quality of a downstream optical signal is improved according to the power of a downstream injection light, the controller 190 controls a corresponding downstream optical transmitter according to the power of the downstream injection light, so that it is possible to increase the transmission rate of the downstream optical signal. Further, the controller 190 applies a modulation scheme having great frequency efficiency (for example, Quadrature Phase Shift Keying (QPSK), Quadrature Amplitude Modulation (QAM), or a multilevel signal scheme) to the downstream optical signal, so that it is possible to increase the transmission rate of the downstream optical signal.

In the following second embodiment of the present invention, a structure, in which downstream optical transmitters are utilized as injection light sources, is added to a passive optical network (PON) using the conventional broadband light sources, so that it is easy to reinforce the power of the injection light.

Figure 2:
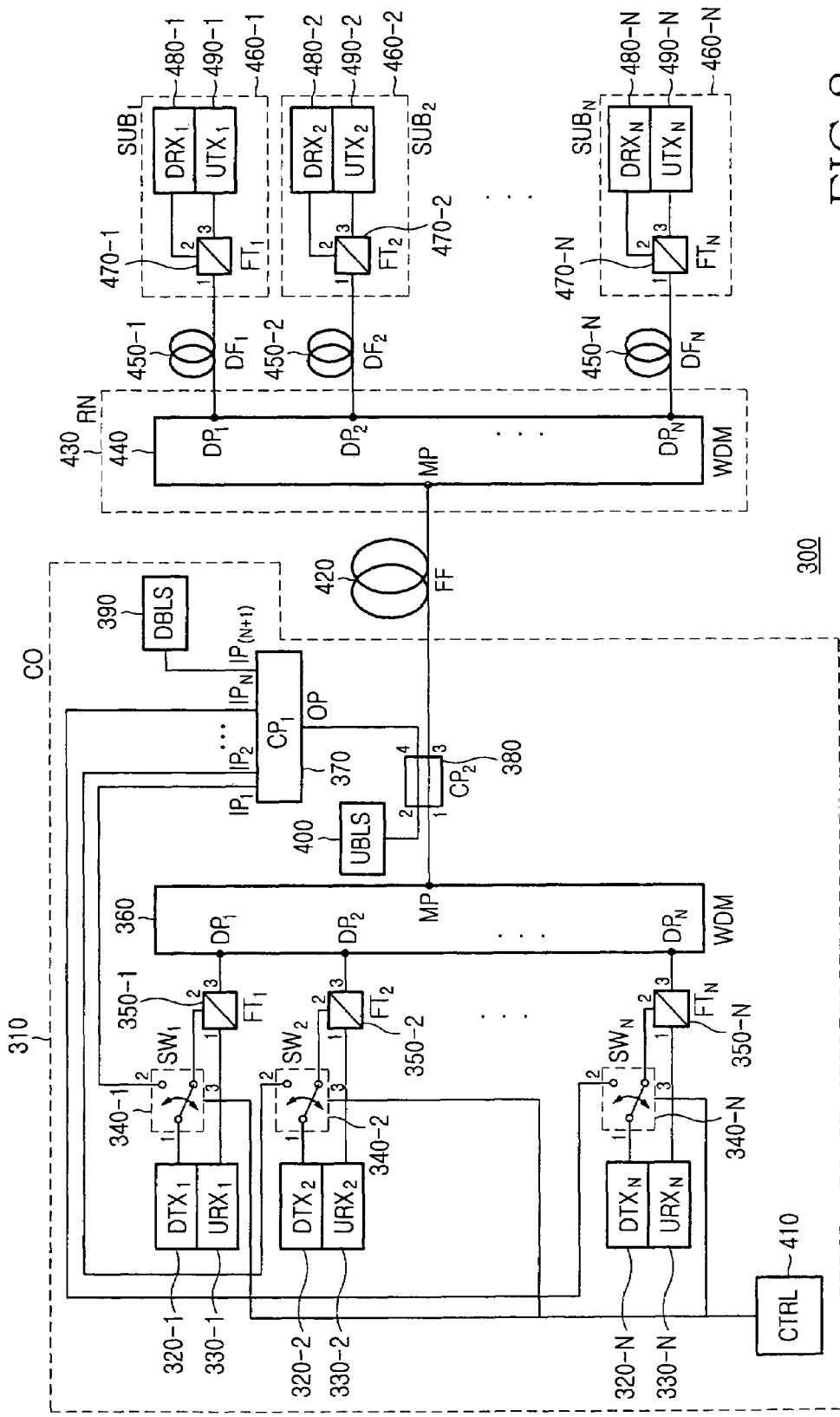
FIG. 2 is a block diagram illustrating a structure of a WDM PON according to a second preferred embodiment of the present invention.

FIG. 2 illustrates the structure of a WDM-PON 300 according to a second embodiment of the present invention. As shown, the WDM-PON 300 includes a CO 310, an RN 430 linked to the CO 310 through a feeder fiber (FF) 420, and a first SUB 460-1 to an $N^{th}$ SUB 460-N sequentially linked to the RN 430 through a first distribution fiber (DF) 450-1 to an $N^{th}$ distribution fiber 450-N.

The CO 310 transmits a multiplexed downstream optical signal having a downstream band to the RN 430 through the feeder fiber 420, and receives a multiplexed upstream optical signal having an upstream band through the feeder fiber 420. The CO 310 includes a first downstream optical transmitter 320-1 to an $N^{th}$ downstream optical transmitter 320-N, a first upstream optical receiver 330-1 to an $N^{th}$ upstream optical receiver 330-N, a first optical switch 340-1 to an $N^{th}$ optical switch 340-N, a first optical filter 350-1 to an $N^{th}$ optical filter 350-N, a WDM 360, a first optical coupler 370, a second optical coupler 380, a downstream broadband light source (DBLS) 390, and an upstream broadband light source (UBLS) 400.

The first downstream optical transmitter 320-1 to the $N^{th}$ downstream optical transmitter 320-N are sequentially linked to the first optical switch 340-1 to the $N^{th}$ optical switch 340-N. If there is no injection light, the $N^{th}$ downstream optical transmitter 320-N outputs a downstream band light having a first downstream wavelength to an $N^{th}$ downstream wavelength. If an $N^{th}$ downstream injection light having an $N^{th}$ downstream wavelength is input, the $N^{th}$ downstream optical transmitter 320-N outputs an $N^{th}$ downstream optical signal having the $N^{th}$ downstream wavelength, which is created by the $N^{th}$ downstream injection light and undergoes data modulation.

The first upstream optical receiver 330-1 to the $N^{th}$ upstream optical receiver 330-N are sequentially linked to the first optical switch 340-1 to the $N^{th}$ optical switch 340-N by one-to-one. The $N^{th}$ upstream optical receiver 330-N converts an input $N^{th}$ upstream optical signal into an electrical signal.

The first optical switch 340-1 to the $N^{th}$ optical switch 340-N are arranged in such a manner that they link the downstream optical transmitters with corresponding optical filters or the first optical coupler 370. The $N^{th}$ optical switch 340-N has a first port to a third port. The first port to the third port of the $N^{th}$ optical switch 340-N are linked to the $N^{th}$ downstream optical transmitter 320-N, the first optical coupler 370, and the $N^{th}$ optical filter 350-N, respectively. The $N^{th}$ optical switch 340-N links the $N^{th}$ downstream optical transmitter 320-N with the $N^{th}$ optical filter 350-N or the first optical coupler 370 according to a control signal of the controller 410.

The first optical filter 350-1 to the $N^{th}$ optical filter 350-N are arranged in such a manner that they link the upstream optical receivers, corresponding optical switches, and the wavelength division multiplexer (WDM) 360 with one another. The $N^{th}$ optical filter 350-N has first to third ports. The first port of the $N^{th}$ optical filter 350-N is a path for an upstream band and linked to the $N^{th}$ upstream optical receiver 330-N. The second port of the $N^{th}$ optical filter 350-N is a path for a downstream band and linked to the third port of the $N^{th}$ optical switch 340-N. The third port of the $N^{th}$ optical filter 350-N is a path for upstream and downstream bands and is linked to the WDM 360. The $N^{th}$ optical filter 350-N, which is a wavelength dependent element, outputs an $N^{th}$ downstream optical signal, which is input to the second port, to the third port. In addition, the $N^{th}$ optical filter outputs an $N^{th}$ downstream injection light, which is input to the third port, to the second port and an $N^{th}$ upstream optical signal, which is input to the third port, to the first port.

The downstream broadband light source 390 is linked to the first optical coupler 370. The downstream broadband light source 390 outputs a downstream band light. The downstream broadband light source 390 may be an erbium doped fiber amplifier.

The first optical coupler 370 is arranged in such a manner that it links the first optical switch 340-1 to the $N^{th}$ optical switch 340-N, the second optical coupler 380, and the downstream broadband light source 390 together. The first optical coupler 370 includes first to $(N+1)^{th}$ input ports (IPs) and an output port (OP). The first input port to the $N^{th}$ input port are sequentially linked to the second ports of the first optical switch 340-1 to the $N^{th}$ optical switch 340-N by one-to-one, the $(N+1)^{th}$ input port is linked to the downstream broadband light source 390, and the output port is linked to the second optical coupler 380. The first optical coupler 370 couples downstream band lights, which are input to the input ports, with each other so as to output a coupled downstream band light through the output port.

The upstream broadband light source 400 is arranged in such a manner that it is linked to the second optical coupler 380. The upstream broadband light source 400 outputs an upstream band light. An erbium doped fiber amplifier may be employed as the upstream broadband light source 400.

The second optical coupler 380 is arranged in such a manner that it links the output port of the first optical coupler 370 with the WDM 360 and the upstream broadband light source 400 with the feeder fiber 420. The second optical coupler 380 includes first to fourth ports. The first port is linked to the WDM 360, the second port is linked to the upstream broadband light source 400, the third port is linked to the feeder fiber 420, and the fourth port is linked to the output port of the first optical coupler 370. The second optical coupler 380 outputs an upstream band light, which is input to the second port, through the third port, and a broadband light, which is input to the forth port, to the first port. The second optical coupler 380 outputs a multiplexed downstream optical signal, which is input to the first port, through the third port. The second optical coupler 380 outputs a multiplexed upstream optical signal, which is input to the third port, through the first port. If necessary, an optical isolator may be positioned between the first optical coupler 370 and the second optical coupler 380.

The WDM 360 is arranged in such a manner that it links the first filter 350-1 to the $N^{th}$ optical filter 350-N with the second optical coupler 380. In particular, the WDM 360 includes a multiplexing port (MP) and first to $N^{th}$ de-multiplexing ports (DPs). The multiplexing port is linked to the first port of the second optical coupler 380, and the first de-multiplexing port to the $N^{th}$ de-multiplexing port are sequentially linked to the first optical filter 50-1 to the $N^{th}$ optical filter 350-N by one-to-one. The WDM 360 sequentially outputs first to $N^{th}$ downstream injection lights, which are generated by spectrum-splicing a broadband light input to the multiplexing port, through the first de-multiplexing port to the $N^{th}$ de-multiplexing port by one-to-one. The WDM 360 multiplexes downstream optical signals, which are input to the de-multiplexing ports, to be output through the multiplexing port. In addition, the WDM 360 de-multiplexes a multiplexed upstream optical signal, which is input to the multiplexing port, to be output through the de-multiplexing ports. In this case, the WDM 360 outputs the de-multiplexed $N^{th}$ upstream optical signal through the $N^{th}$ de-multiplexing port.

The controller 410 detects idle downstream optical transmitters among the first downstream optical transmitter 320-1 to the $N^{th}$ downstream optical transmitter 320-N. The controller 410 can detect destinations based on a list of data in a transmission waiting state. In addition, the controller 410 can recognize SUBs absent from the data list as idle SUBs. For example, a process of transmitting a downstream optical signal in the CO 310 when only the $N^{th}$ downstream optical transmitter 320-N is in the idle state will be described below.

The controller 410 controls the first optical switch 340-1 to the $(N-1)^{th}$ optical switch 340-(N-1) to connect the first ports thereof to the third ports thereof. In addition, the controller 410 controls the $N^{th}$ optical switch 340-N to link the first port thereof to the second port of thereof. A downstream band light output from the $N^{th}$ downstream optical transmitter 320-N is input to the multiplexing port of the WDM 360 by sequentially passing through the $N^{th}$ optical switch 340-N, the first optical coupler 370, and the second optical coupler 380. The WDM 360 sequentially outputs first to $N^{th}$ downstream injection lights, which are generated by spectrum-splicing the input downstream band light, through the first de-multiplexing port to the $N^{th}$ de-multiplexing port by one-to-one. The first downstream injection light to the $(N-1)^{th}$ downstream injection light are input to the first downstream optical transmitter 320-1 to the $(N-1)^{th}$ downstream optical transmitter 320-(N-1) through the first optical filter 350-1 to the $(N-1)^{th}$ optical filter 350-(N-1) and the first optical switch 340-1 to the $(N-1)^{th}$ optical switch 140-(N-1). The first downstream optical transmitter 320-1 to the $(N-1)^{th}$ downstream optical transmitter 320-(N-1) output first to $(N-1)^{th}$ downstream optical signals, which are generated by the first downstream injection light to the $(N-1)^{th}$ downstream injection light and undergo data modulation. The first downstream optical signal to the $(N-1)^{th}$ downstream optical signal are input to the WDM 360 through the first optical switch 340-1 to the $(N-1)^{th}$ optical switch 340-(N-1) and the first optical filter 350-1 to the $(N-1)^{th}$ optical filter 350-(N-1). The WDM 360 multiplexes the first downstream optical signal to the $(N-1)^{th}$ downstream optical signal to be output through the multiplexing port. The $N^{th}$ downstream injection light disappears after it is input to the third port of the $N^{th}$ optical switch (340-N) through the $N^{th}$ optical filter 350-N.

The RN 430 transmits spliced downstream optical signals obtained by de-multiplexing a multiplexed downstream optical signal, which is input through the feeder fiber 420, to the SUBs through the distribution fibers. The RN 430 transmits first to $N^{th}$ upstream injection lights, which are generated by spectrum-splicing an upstream band light input through the feeder fiber 420, to the first SUB 460-1 to the $N^{th}$ SUB 460-N through the first distribution fiber 450-1 to the $N^{th}$ distribution fiber 450-N. The RN 430 transmits a multiplexed upstream optical signal obtained by multiplexing upstream optical signals, which are input through the distribution fibers, to the CO 310 through the feeder fiber 420. The RN 430 includes a WDM 440.

The WDM 440 is arranged in such a manner that it links the feeder fiber 420 with the first distribution fiber 450-1 to the $N^{th}$ distribution fiber 450-N. The WDM 440 includes a multiplexing port and first to $N^{th}$ de-multiplexing ports. The multiplexing port is linked to the feeder fiber 420, and the first de-multiplexing port to the $N^{th}$ de-multiplexing port are sequentially linked to the first distribution fiber 450-1 to the $N^{th}$ distribution fiber 450-N by one-to-one. The WDM 440 de-multiplexes a multiplexed downstream optical signal, which is input to the multiplexing port, to be output through the de-multiplexing ports. The WDM 440 spectrum-splices an upstream band light, which is input to the multiplexing port, to be output through the first de-multiplexing port to the $N^{th}$ de-multiplexing port. The WDM 440 multiplexes upstream optical signals, which are input to the de-multiplexing ports, to be output through the multiplexing port. At this time, the WDM 440 outputs a de-multiplexed $N^{th}$ upstream injection light and a de-multiplexed $N^{th}$ downstream optical signal through the $N^{th}$ de-multiplexing port.

The first SUB 460-1 to the $N^{th}$ SUB 460-N transmit upstream optical signals to the RN 430 through corresponding distribution fibers, receive downstream optical signals through the distribution fibers, and receive first to $N^{th}$ upstream injection lights through the first distribution fiber 450-1 to the $N^{th}$ distribution fiber 450-N. In addition, the first SUB 460-1 to the $N^{th}$ SUB 460-N receive corresponding downstream optical signals through the distribution fibers. The $N^{th}$ SUB 460-N includes an $N^{th}$ optical filter 470-N, an $N^{th}$ downstream optical receiver 480-N, and an $N^{th}$ upstream optical transmitter 490-N.

The $N^{th}$ optical filter 470-N is arranged in such a manner that it links the $N^{th}$ distribution fiber 450-N with the $N^{th}$ downstream optical receiver 480-N and the $N^{th}$ upstream optical transmitter 490-N. The $N^{th}$ optical filter 470-N has first to third ports. The first port, which is a path for upstream and downstream wavelength bands, is linked to the $N^{th}$ distribution fiber 450-N, the second port, which is a path for a downstream wavelength band, is linked to the $N^{th}$ downstream optical receiver 260-N, and the third port, which is a path for an upstream wavelength band, is linked to the $N^{th}$ upstream optical transmitter 490-N. The $N^{th}$ optical filter 470-N, which is a wavelength dependent element, outputs the $N^{th}$ downstream optical signal, which is input to the first port, to the second port. The $N^{th}$ optical filter 470-N outputs an $N^{th}$ upstream injection light, which is input to the first port, to the third port. The $N^{th}$ optical filter 470-N outputs the $N^{th}$ upstream optical signal, which is input to the third port, to the first port.

The $N^{th}$ upstream optical transmitter 490-N is linked to the third port of the N h optical filter 470-N. The $N^{th}$ upstream optical transmitter 490-N outputs an $N^{th}$ upstream optical signal having an $N^{th}$ upstream wavelength, which is generated by the input $N^{th}$ upstream injection light and undergoes data modulation. A laser diode for outputting a light having a specific wavelength may be employed as the $N^{th}$ upstream optical transmitter 490-N.

The $N^{th}$ downstream optical receiver 480-N is linked to the second port of the $N^{th}$ optical filter 470-N. The $N^{th}$ downstream optical receiver 480-N converts an $N^{th}$ downstream optical signal, which has been input, into an electrical signal.

As described above, the WDM PON having a wavelength-locked optical transmitter according to a second embodiment of the present invention utilizes downstream band lights output from idle downstream optical transmitters as injection light sources for remaining downstream optical transmitters, so that it is possible to ensure a superior transmission quality with a low cost. In addition, it is possible to easily reinforce power of the downstream injection lights by increasing the number of downstream optical transmitters utilized as the injection light sources. In addition, the WDM PON using a wavelength-locked optical transmitter according to a second embodiment of the present invention improves a transmission speed based on the improvement of a transmission quality, so that it is possible to enhance the efficiency of the entire optical network.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A wavelength-division-multiplexed passive optical network (WDM PON) comprising:

a central office configured to transmit a multiplexed downstream optical signal; and a plurality of subscriber devices coupled to the central office via a feeder fiber, wherein the central office comprises:

a plurality of downstream optical transmitters configured to output downstream optical signals having wavelengths according to downstream injection lights;

a wavelength division multiplexer including a plurality of de-multiplexing ports linked to the plurality of the downstream optical transmitters, and a multiplexing port linked to the feeder fiber, the wavelength division multiplexer configured to perform wavelength division multiplexing the downstream optical signals and wavelength division de-multiplexing a downstream band light into the downstream injection light;

at least one optical switch interposed between the downstream optical transmitters and the de-multiplexing ports and configured to input a downstream band light output from a selected downstream optical transmitter to the multiplexing port and for inputting a downstream optical signal output from a remaining downstream optical transmitter, which is not selected, to the de-multiplexing port; and wherein the optical switch has a first port to a third port for switching the downstream optical transmitters between the de-multiplexing ports and a first optical coupler.

2. The WDM PON as claimed in claim 1, wherein the central office further includes a plurality of optical switches interposed between the downstream optical transmitters and the de-multiplexing ports.

3. The WDM PON as claimed in claim 2, wherein the central office further includes a controller configured to select an idle downstream optical transmitter from among the plurality of downstream optical transmitters and for controlling the optical switch coupled to the selected downstream optical transmitter.

4. The WDM PON as claimed in claim 1, wherein the central office includes a downstream broadband light source, which inputs a different downstream band light to the first optical coupler.

5. The WDM PON as claimed in claim 1, wherein the central office includes a second optical coupler, which inputs coupled downstream band lights input from the first optical coupler to the multiplexing port and transmits a multiplexed downstream optical signal output from the multiplexing port through the feeder fiber.

6. The WDM PON as claimed in claim 1, wherein the downstream optical transmitter is a Fabry-Perot laser diode.

7. The WDM PON as claimed in claim 1, wherein the downstream optical transmitter is a reflective semiconductor optical amplifier.

8. The WDM PON as claimed in claim 1, wherein the central office further comprising a plurality of optical filters coupled between the plurality of optical switches and the de-multiplexing ports.

9. The WDM PON as claimed in claim 8, wherein the central office further comprising a plurality of upstream optical receivers coupled to the plurality of optical filters.

* * * * *